Figure 1:
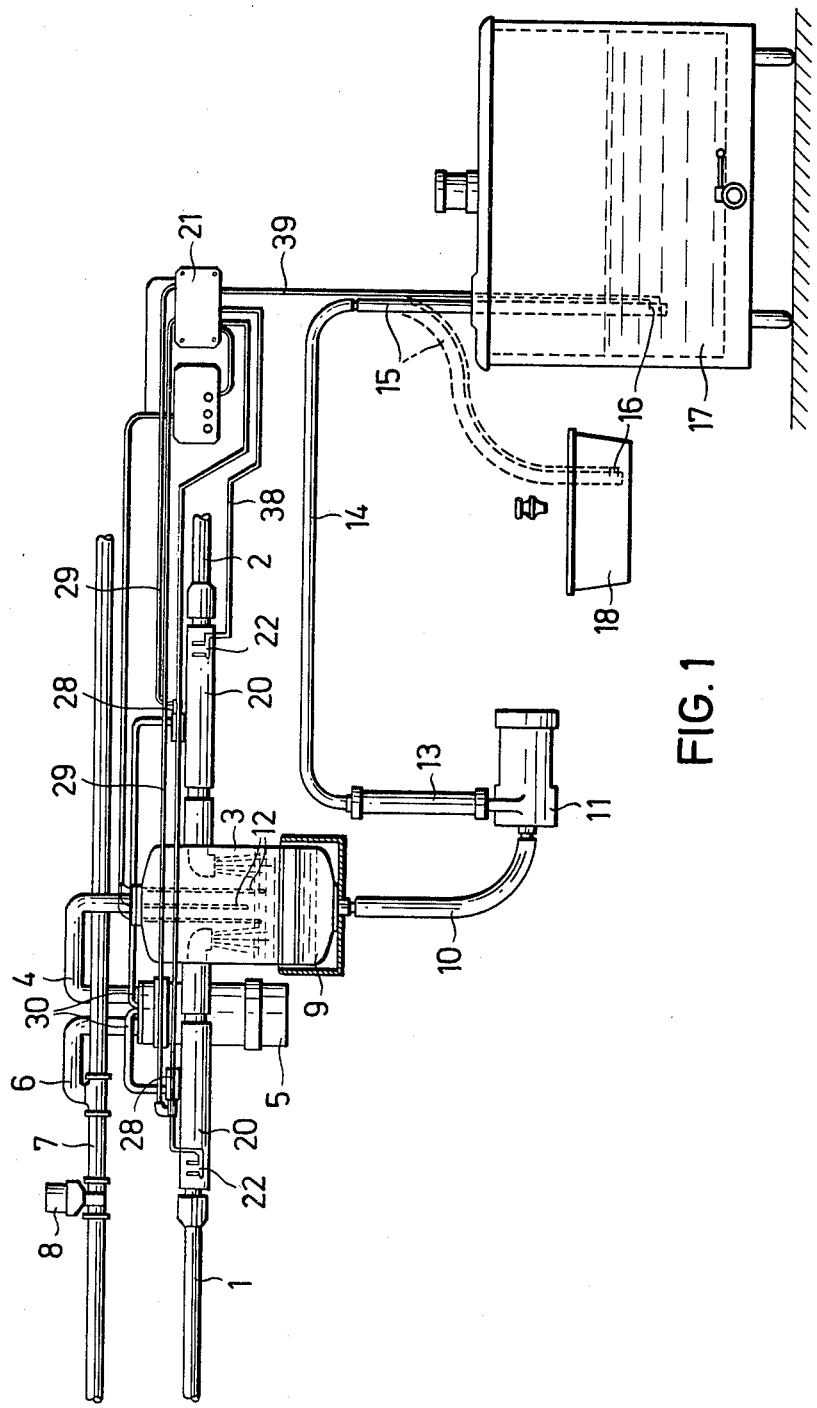

United States Patent [19]

Celi

[11] 4,232,703

[45] Nov. 11, 1980

[54] SAFETY CLOSE-OFF VALVE ARRANGEMENT FOR PIPE CONDUIT SYSTEMS AND INSTALLATIONS

[75] Inventor: Antonio M. Celi, Neustadt, Fed. Rep. of Germany

[73] Assignee: Karl W. Wiegand, Hennef, Fed. Rep. of Germany

[21] Appl. No.: 862,820

[22] Filed: Dec. 21, 1977

[30] Foreign Application Priority Data

Dec. 23, 1976 [DE]  Fed. Rep. of Germany ...... 2658361

[51] Int. Cl.³ .......................................... F16K 31/00
[52] U.S. Cl. ................................. 137/172; 137/240; 137/205
[58] Field of Search ...................... 137/172, 240, 487.5, 137/205; 251/5

[56] References Cited

U.S. PATENT DOCUMENTS

| | | | |
|---|---|---|---|
| 2,193,261 | 3/1940 | Thomson | 137/172 X |
| 3,235,064 | 2/1966 | Frost | 251/5 X |
| 3,556,461 | 1/1971 | Little | 251/5 |

FOREIGN PATENT DOCUMENTS

626694  7/1949  United Kingdom .................... 137/172

*Primary Examiner*—Alan Cohan
*Attorney, Agent, or Firm*—Michael J. Striker

[57] ABSTRACT

A safety arrangement is utilized for separating liquids including milk, extraneous water, and cleaning medium in a system which has two supply conduits, a first running container for receiving the liquids from the supply conduits, a negative pressure device connected with the first running container and a pump conveying liquids from the first running container to separate receiving containers. The arrangement has two first sensing elements in the supply conduits upstream of the first running container, and a second conduit downstream of the latter and upstream of the receiving containers. Close-off valves are located between the first sensing elements and the first running container. An electronic control device connects the sensing elements with the close-off valves so as to actuate the latter in response to sensing of characteristics of the liquids at the above-mentioned locations, by the sensing elements.

5 Claims, 4 Drawing Figures

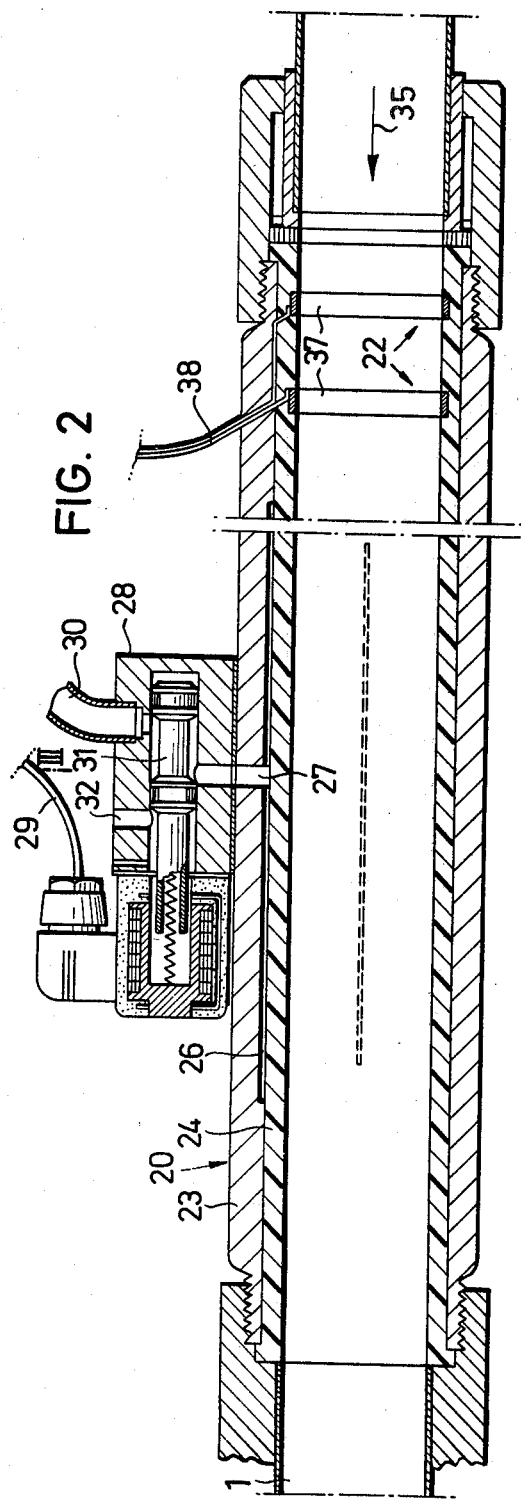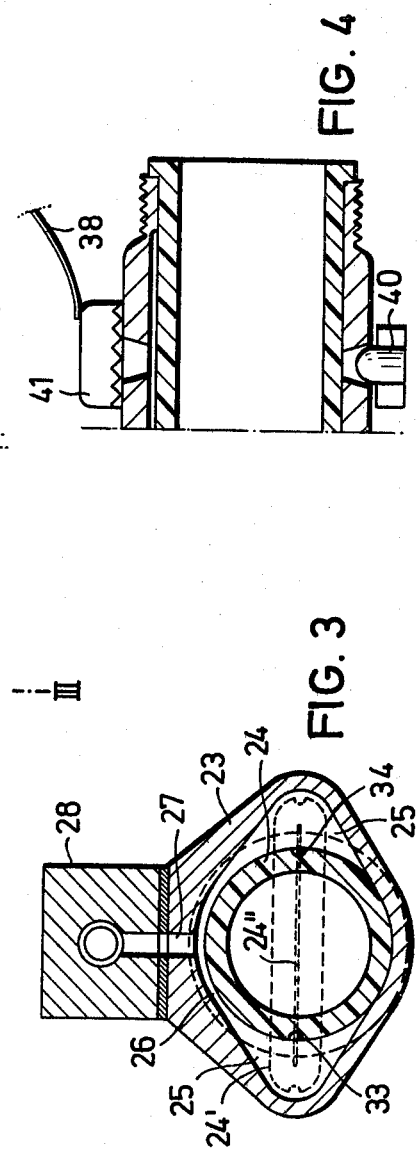

SAFETY CLOSE-OFF VALVE ARRANGEMENT FOR PIPE CONDUIT SYSTEMS AND INSTALLATIONS

The invention relates to a safety close-off valve arrangement for pipe conduit systems and installation, through which liquids of different natures are fed one after the other and are subsequently separated, and relates in particular to a safety close-off valve arrangement for the separation of milk, extraneous water and cleansing liquid in milking installations with automatic cleansing.

In a known self operating circulation cleansing of suction milking plants the discharge of the vacuum milk filter lock at the start of the cleansing process is displaced to a position over a cleaning tank, in which the milk product is placed and which is connected through its long milk hoses to the milk product cleansing pipe. The cleansing liquid is sucked through the milk product using the full vacuum of the vacuum power unit, fed with turbulence through the pipe conduit of the milking plant and through the vacuum milk filter lock back again into the cleansing tank. When the power unit is running first cold clear water is sucked out of the cleansing tank and then the cleansing and disinfecting solution through all parts of the plant which carry milk and are fed back into the cleansing tank.

The remaining milk before cleansing and the remaining water after cleansing are removed using cleansing plugs of foam material, which are sucked through the pipe conduit.

The purification of the milk product during the use of automatic machines for cleansing milk products takes place, correspondingly, in this way. The milk product which are in the cleansing tank are connected up to the automatic cleansing machine. The vacuum of the milking plant acts in this case as the drive as well. Using sucking in and discharge of the cleansing liquid cleansing and disinfection is carried out here also in a closed circuit.

In known purifying plants a large amount of milk is lost when changing over from milk displacement to cleansing and vice-versa, when the strict hygienic regulations have to be complied with. Moreover the cleansing plugs must always be specially placed in the pipe conduit and removed again after cleansing.

In other known milking plants in general the remainder of milk which is still in the conduit is forced out of the conduit using plastics plugs by connecting up a water supply after termination of the milking process. Dilution of the remaining milk can easily appear when this process is used.

The aim of the invention, is to simplify the changeover from conveying of milk to cleansing and vice-versa and to avoid mixing of milk, extraneous water and/or cleansing liquid.

According to the invention this aim is achieved using at least two flow control devices which are arranged in a spaced relationship to each other before the separate lead-off of the different liquids, which react to the differing liquids and which are connected via a regulator with a close-off valve which is arranged after the first control device.

Using this arrangement it is possible in a simple manner to ascertain the passage of different liquids exactly and to temporarily close off the flow of liquid at the point of transition from one liquid to the other, in order to change over the discharge of liquid or as the case may be to swing it to a position over the catching device which is provided for the relevant liquid.

In a preferred embodiment of the invention the flow control device takes the form of electrical resistance measuring electrodes and are connected to a regulating device, which compares the electrical resistance at the control devices which are spaced with respect to each other and in the case of differences in resistance operates a changeover device on the close-off valve.

In place of electrical resistance measuring electrodes the flow control devices in an alternative embodiment of the invention can take the form of light barriers and be connected with a regulating device, which compares the measured photoelectric cell current at the control devices which are spaced with respect to each other and in the case of current differences operate in the same way a changeover device on the close/off valve.

In such an embodiment it is only necessary for there to be present in the flow channel of the safety close-off valve or if need be at the respective point of the pipe conduit system, at which the light barriers are arranged, sections of hose for pipe conduit made up of light permeable material for the passage of the light beam which influences the photoelectric cells of the light barriers. These sections can be of glass or of a suitable light permeable plastics material.

The safety close-off valve according to a further characteristic of the invention is constructed using a flow hose of flexible material, which is fastened in a sealed manner in a sealed housing with pocket-like housing extensions and with a changeover valve from normal pressure to sub-atmospheric pressure and vice-versa and whose flow channel can be extended to its full width of opening by virtue of the sub-atmospheric pressure operating on the outer face of the hose and which can be compressed together into the completely closed position due to the prevailing sub-atmospheric pressure in the connecting conduit at normal outside pressure. The flow hose advantageously has on its two longitudinal sides opposing indentations which act as points of kinking during collapse in the closed off position.

Both the measuring electrodes and the light barrier arrangement can be cast into the flow hose.

Further particulars and advantages of the invention will become apparent from the following description of a preferred embodiment used in a milking plant with automatic cleansing.

There are shown:

FIG. 1 The installation layout for a plant with two milk connecting conduits,

FIG. 2 Individual detail of the safety close-off valve of the milking installation in enlarged detail with respect to FIG. 1, FIG. 3 A vertical section through the safety close-off valve taken along the line III—III in FIG. 2 and, FIG. 4 A second embodiment which differs from FIGS. 1 and 2 of the safety close-off valve arrangement.

The milking installation shown in the drawing has two connecting conduits 1, 2 for the transport of milk, which terminate in a container for the first running 3 which acts as a lock for the milk, which is connected to a vacuum tank 5, via a vacuum conduit 4, which in its turn is connected via a further connecting conduit 6, to a vacuum conduit 7, which is connected to a device for producing sub-atmospheric pressure which is not shown, the conduit being kept at a constant sub-atmospheric pressure by means of a vacuum control valve 8.

The milk 9, which is collected in the container for the first running 3, is pumped off through a descending conduit 10, by means of a pump 11, which is arranged underneath the container 3, which pump is actuated by a level controller 12, which is arranged in the container 3, and which transports the milk 9, through a tubular filter 13, a pipe 14, and a rubber hose 15, having a flow controlling device 16, arranged at the end of the hose to a milk collecting container 17, or similar.

A flow-off tank 18 for water is located close to the milk collecting container 17, into which the rubber hose 15 can be hung during the cleaning process, as is shown in FIG. 1 in dashed lines.

In each of the two milk collecting conduits 1, 2 a safety close-off valve 20 is located, which is connected via an electronic regulator 21 on the one hand to the flow controlling device 16, on the lower end of the rubber hose 15, and on the other hand to a flow control device 22, which is located behind the close-off valve 20.

Instead of the two connecting conduits 1, 2 shown in FIG. 1, a smaller or a greater number of conduits can terminate in the container for first running 3, in which case however a safety close-off valve 20 is arranged in each connecting conduits. The safety close-off valve 20 is shown in detail in FIGS. 2 & 3. As can be seen from the drawings, the safety close-off valve 20 has in a sealed valve housing 23 a flow hose 24 consisting of flexible material, which is fastened in a sealed manner at both ends of the valve housing 23. The valve housing 23 is, as can be seen from FIG. 3 taken in conjunction with FIG. 2, constructed over a part of its length so as to have two opposing side pocket-like housing extensions 25, which form a space 26, for expansion of the flow hose 24 and which extends over a part of the length of the periphery of the flow hose. The space 26 for expansion is in connection with an upper opening with a regulating valve 28, which takes the form of a sliding piston valve with electromagnetic operation and which is connected by means of a control cable 29 with the electronic regulator 21 which is shown in FIG. 1. In the position of the valve shown in FIG. 2 the opening 27 and hence the expansion space 26 is connected to a vacuum connection 30, which is connected to the vacuum tank 5. In this position of the valve the sub-atmospheric pressure prevailing in the vacuum tank 5 operates against the vacuum prevailing in the connecting conduits 1, 2 and produces the effect, that the flow hose is extended to its full flow cross section.

In the other terminal position the slide piston 31 leaves open an upper opening 32, which connects the expansion space 26 with the surrounding atmosphere, so that the flow hose 24 is pressed together into the flat position 24 shown in FIG. 3 in dashed lines due to the normal pressure which is operating on it, in which position the inner faces of the hose 24" lie against each other and close off the liquid flow by means of the valve. Two longitudinal indentations 33, 34 on the two opposing outer sides of the flow hose 24 produce the effect, that the hose always takes up the close position 24' as defined in FIG. 3.

In the direction of flow 35 before each safety close-off valve 20 the flow control device 22 is located either at the entrance to the flow hose 24 or in the section of conduit which is upstream of it, which, in the embodiment in FIG. 2 is made up of two resistance measuring electrodes 37 which are parallel and are closely spaced with respect to each other, which can be cast into the hose 24 or into the section of conduit preceding it and which are connected via a cable 38 with the electronic regulator 21 which is shown in FIG. 1, and to which the flow control device 16 at the lower end of the rubber hose 15 is also connected via a further cable 39. The spacing between the flow control device 22 and the flows-off valve 20 depends on the speed of reaction of the electronic regulator 21, which is adjustable by means of potentiometers.

In the present embodiment the flow control device 16 is also constructed having resistance measuring electrodes of the same type as the flow control device 22. When milk flows through the connecting conduit 1, 2, the same resistance is measured at the upper electrode 37 as at the measurement electrode of the flow control device 16, so that the slide piston 31 of the control valve(s) 28 remain(s) in the position shown in FIG. 2.

If following the milk extraneous water and/or cleansing liquid is passed through the connecting conduit 1, 2 and these reach the electrodes 37 which are placed before one of the close-off valves 20 the electrodes measure a resistance, which differs from the resistance measured by the lower electrodes.

Due to this potential difference the electronic regulator 21 which takes the form of an integrated circuit is triggered off, which produces the effect, that the slide piston 31 of the control valve 28 is displaced from the working position shown in FIG. 2 to the opposing terminal position, in which the expansion space 26, for the flow hose 24 is no longer connected to the prevailing sub-atmospheric pressure in the vacuum tank 5, but rather is under the pressure of the surrounding atmosphere via the openings 27, 32 so that the flow hose 24 in the manner which is shown in FIG. 3 is pressed together in such a way, that the inner side 24" of the hose lie flatly against each other and close off any further flow of liquid. The electronic regulator 21 further controls the pump 11 so that the remains of liquid which are still in the container for first runnings 3, these being milk, extraneous water or cleansing liquid, can be transported away to the milk container 17 or to the water run-off tank 18. In the same way as when there was a transition from milk to extraneous water or cleansing liquid the flow control devices 16, 22 also react when there is a transition from extraneous water or cleansing liquid to milk and to any lack of extraneous water, cleansing liquid or milk in the conduit. This also produces the effect of operating the two close-off valves 20, so that the rubber hose 15, which, after the above said closing off stage had been brought out of the milk collecting container 17 into the water flow-off tank 18, can again be hung into the milk collection tank 17 after the cleansing liquid remaining in the container or first runnings 3 has been carried away.

Instead of the resistance measurement electrodes 37 shown in FIG. 2 the flow control devices 16, 22 can also employ a light barrier arrangement with a light source 40 and a photocell 41 (FIG. 4). In this case it is only necessary, for the section of the connecting conduit 1, 2 or the hose 15, 24 into which the light barrier 40, 41 is introduced, to consist of a light permeable material. The light barrier arrangement 40, 41 are, as is the case with the resistance measurement electrodes 37 connected via a cable 38 with the electronic regulator 21. It is to be understood that the flow control device 16 of the lower end portion of the rubber hose 15 is provided with a light barrier arrangement similar to that mounted on the hose 24 (see FIG. 4). The control device 16 is connected to the regulator 21 via the cable 39 (see FIG. 1) so that the regulator 21 compares the two signals received from the device 16 and the hose 24. The light source 40 directs light through the flow of liquid.

If the same liquid is flowing past both flow control devices 16, 22, be this milk, extraneous water or cleansing liquid, the same lights are measured at and the same currents are generated by the two photocells 41. Should a difference in current occur at the point of transition from one liquid to the other, then the close-off valve 20 is operated in the same way, as has been described above.

I claim:

1. A safety arrangement for separating liquids including milk, extraneous water and cleansing medium, for use with a system including a first running container, two supply conduits located upstream of the first running container and supplying the liquid into the latter, a negative pressure device connected with the first running container, an automatic cleansing device operative with the cleansing medium, a pump located downstream of and conveying the liquids from the first running container, and separate receiving means for receiving the respective liquids, the arrangement comprising sensing means operative for sensing characteristics of the different liquids and including two first sensing elements each located in a respective one of the supply conduits upstream of the first running container, and a second sensing element located downstream of the pump and immediately upstream of the receiving means so as to sense the characteristic of the liquids at these substantially spaced locations; closing means including two close-off valves each located between a respective one of said first sensing elements and the first running container and connected with the negative pressure device so as to operate by the latter; and common electronic control means arranged to electronically connect said sensing means with said closing means so as to actuate the latter in response to sensing of characteristics of the liquids by said sensing means.

2. Close-off valve arrangement according to claim 1, wherein said sensing elements take the form of electrical resistance measuring electrodes and are connected to said electronic control means which compares the electrical resistance at the sensing elements which are spaced with respect to each other and in the case of differences in resistance operates a changeover device on each of said close-off valves.

3. An arrangement according to claim 1, wherein each of said close-off valves is constructed using a flow hose of flexible material, which is fastened in a sealed manner in a sealed housing with pocket-like side housing extensions and with a changeover valve from normal pressure to sub-atmospheric pressure and vice versa and whose flow channel can be extended to its full width of opening by virtue of the sub-atmospheric pressure operating on the outer face of the hose and which can be compressed together into the completely closed position due to the prevailing sub-atmospheric pressure in the connecting conduit at normal outside pressure.

4. An arrangement according to claim 3, wherein the flow hose of each of said close-off valves has opposing indentations on its two longitudinal side which acts as regions of kinking during collapse.

5. An arrangement according to claim 1 wherein each of said sensing elements includes a source of light directing light through the liquids, and a photoelectric cell sensing light passed through the liquids and connected with said control means so that the latter actuates said closing means in response to the relation between the current generated by the photoelectric cells of said first sensing elements and the current generated by the photoelectric cell of said second sensing element.

* * * * *